(12) United States Patent
Tubergen et al.

(10) Patent No.: US 11,623,174 B2
(45) Date of Patent: Apr. 11, 2023

(54) TEMPERATURE CONTROLLED EXHAUST STEAM WATER FILTER FOR COFFEE ROASTERS

(71) Applicant: VORTX KLEANAIR SYSTEMS, Santa Rosa, CA (US)

(72) Inventors: Ren Tubergen, Alto, MI (US); Ronald G. Kleist, Santa Rosa, CA (US)

(73) Assignee: VORTX KLEANAIR SYSTEMS, Santa Rosa, CA (US)

( * ) Notice: Subject to any disclaimer, the term of this patent is extended or adjusted under 35 U.S.C. 154(b) by 0 days.

(21) Appl. No.: 17/309,446

(22) PCT Filed: Nov. 27, 2019

(86) PCT No.: PCT/US2019/063535
§ 371 (c)(1),
(2) Date: May 27, 2021

(87) PCT Pub. No.: WO2020/112951
PCT Pub. Date: Jun. 4, 2020

(65) Prior Publication Data
US 2022/0032226 A1 Feb. 3, 2022

Related U.S. Application Data

(60) Provisional application No. 62/772,023, filed on Nov. 27, 2018.

(51) Int. Cl.
*B01D 45/12* (2006.01)
*B01D 47/06* (2006.01)
(Continued)

(52) U.S. Cl.
CPC ............. *B01D 47/06* (2013.01); *B01D 45/12* (2013.01); *B01D 50/40* (2022.01); *B04C 5/185* (2013.01);
(Continued)

(58) Field of Classification Search
CPC ........ B01D 47/06; B01D 45/12; B01D 50/40; B01D 2247/101; B04C 5/185; B04C 5/20; B04C 11/00; B04C 2009/008
See application file for complete search history.

(56) References Cited

U.S. PATENT DOCUMENTS 5,944,512 A * 8/1999 Ludwig ................... F23G 7/065
99/473
6,860,845 B1 * 3/2005 Miller ....................... B04B 1/20
706/900
(Continued)

FOREIGN PATENT DOCUMENTS

CN 105066511 A * 11/2015
CN 107245343 A * 10/2017
(Continued)

*Primary Examiner* — Dung H Bui (57) ABSTRACT

A cyclonic chiller-separator, including a vertically oriented treatment tower defining an interior space and having an exhaust inlet disposed in an upper portion, and a chimney with an exhaust outlet; an exhaust stream conduit in fluid communication with said interior volume of said treatment tower through said exhaust inlet, wherein said exhaust inlet is configured to induce cyclonic fluid motion in an exhaust stream entering said interior volume; a coolant water source; and a plurality of nozzles disposed about interior walls of said treatment tower and in fluid communication with said coolant water source for spraying cooling water into said interior volume above and into an exhaust stream introduced into said interior volume so as to cool, condense, and precipitate volatile organic compounds and organic acids, and to entrain and remove particulates from the exhaust stream.

20 Claims, 4 Drawing Sheets

(51) Int. Cl.
 B01D 50/40 (2022.01)
 B04C 5/185 (2006.01)
 B04C 5/20 (2006.01)
 B04C 11/00 (2006.01)
 *B04C 9/00* (2006.01)

(52) U.S. Cl.
 CPC ................ B04C 5/20 (2013.01); B04C 11/00 (2013.01); *B01D 2247/101* (2013.01); *B04C 2009/008* (2013.01)

(56) References Cited

U.S. PATENT DOCUMENTS

| | | | |
|---|---|---|---|
| 2011/0159596 A1* | 6/2011 | Keinan | ................ G01N 1/2211 422/86 |
| 2016/0243487 A1* | 8/2016 | Kim | .......................... A23F 5/04 |
| 2019/0151771 A1* | 5/2019 | Thomas | ................ B01D 5/0042 |
| 2019/0225525 A1* | 7/2019 | Fayerweather | ......... C03B 5/235 |

FOREIGN PATENT DOCUMENTS

| | | | | | |
|---|---|---|---|---|---|
| CN | 107824043 | A | * | 3/2018 | |
| CN | 107827373 | A | * | 3/2018 | ............. B82Y 30/00 |
| CN | 108114555 | A | * | 6/2018 | ............. B01D 47/06 |
| CN | 108579387 | A | * | 9/2018 | |
| DE | 295 19 034 | | | 3/1996 | |
| JP | 2004218532 | A | * | 8/2004 | |
| KR | 20140008932 | A | * | 1/2014 | ............. B01D 45/12 |
| KR | 101 379 728 | B1 | | 3/2014 | |
| KR | 101866818 | B1 | * | 7/2018 | ............. B01D 45/12 |
| WO | WO-2018182580 | A1 | * | 10/2018 | ............. B01D 45/12 |

* cited by examiner

TEMPERATURE CONTROLLED EXHAUST STEAM WATER FILTER FOR COFFEE ROASTERS

BACKGROUND OF THE INVENTION

Technical Field

The present invention relates most generally to exhaust gas processing apparatus, and more particularly to wet scrubbers, and still more particularly to a cyclonic chiller-separator smoke and VOC condensation/precipitation and exhaust filtration system for coffee roasters. It may be characterized as an oil vapor recovery system coupled with a dust/smoke collection system to separate both oil vapor and solid particles from a gaseous waste stream.

Background Art

There are more than 4000 commercial coffee roasters in the United States, and well over 30,000 specialty coffee shops, many of which include small batch roasters. Those small roasters use small-capacity roasting machines—e.g., batch roasters with a 25-pound per batch capacity. Commercial and industrial continuous roasters, by contrast, may have capacities exceeding four tons per hour. All roasting processes result in air pollution emissions. Those emissions include: (1) particulate matter, consisting principally of coffee chaff, (2) condensable volatile organic compounds (VOCs); and (3) organic acids; and (4) fuel combustion byproducts, such as CO and $CO_2$, these latter two gases owing largely to the fact that roasters are generally gas-fired systems. In addition, coffee roasting produces odorous compounds, such as nitrogen oxides (NOx), sulfur oxides (SOx), and toxic compounds, such as acrolein, acetaldehyde, and formaldehyde. While several other operations in coffee production cause emissions, roasting is the primary source of gaseous pollution. Neighbors near roasting facilities frequently (and understandably) complain of smoke and odor.

The problem of air polluting emissions from coffee roasting has been significant enough to give rise to emissions standards and regulations, both at the national level in EPA regulations (e.g., EPA AP-42, Fifth Ed., Vol. 1, Chapter 9: Food and Agriculture Industries, Section 13.2, Coffee Roasting) and local regulations (e.g., numerous air quality districts in California promulgating and implementing regulations relating to smoke and odor from roasters). Most standards and regulations require that at least 95-99% of all VOCs and hazardous pollutants be destroyed. AP-42. District Rules in California typically require a permit for any coffee roaster with a maximum capacity above 11 pounds (5 kg). If equipment or a process in coffee processing and roasting emits more than 10 pounds per day of particulate matter (PM10), oxides of nitrogen (NOx), volatile organic compounds (VOC), or oxides of sulfur (SOx), the application for a permit must include a best available control technology (BACT) analysis. Except for very large installations, coffee roasters do not typically trigger BACT requirements; however, when triggered, the air quality management control districts impose stringent guidelines.

Thus, motivated not only by the desire to avoid costly fines, but also by the desire to engage in responsible stewardship of the environment and be recognized as a "good neighbor" by local residents, coffee roasters and domestic industrial coffee roaster manufacturers have attempted to meet the regulatory schemes in a number of ways: (1) by ignoring the issue and hoping to escape regulatory scrutiny; or (2) by making and using systems that roast with a cleaner exhaust (i.e., one having reduced NOx or $CO_2$, but little to any reduction in smoke, odor and VOCs) by using an electric source, such as a lamp. This more responsible option may be accomplished in a number of ways, including by making roasters that use infrared heat rather than hot air. This, however, is a relatively recent, still somewhat rare, and expensive technical solution. More commonly, particularly for large scale roasters, pollution abatement is accomplished by burning exhaust products with afterburners. Larger roasting facilities may even employ catalytic or regenerative thermal oxidizers, some including the recirculation of exhaust back into the roaster to be heated again to roasting temperatures. Even so, each of these approaches involves the use of heat to incinerate the exhaust contents, thus considerable energy consumption.

Air pollution is an old and vexing problem, so it will be appreciated that technology to reduce air pollution is a mature art, though its importance is by no means diminished. It has long been known to abate air pollution from industrial exhaust stacks using exhaust gas cleaners of many kinds, including wet scrubbers and cyclonic wet scrubbers. Exemplary patents in the art include the following. These patents are representative only—neither necessarily the most salient nor constituting anything more than a small fraction of available pertinent references.

U.S. Pat. No. 3,835,796, to Sanga, discloses an exhaust gas cleaner for incinerators which includes a horizontal purifying duct extending from an incinerating furnace. The purifying duct has internal spray nozzles for spraying water in the direction of flow of the exhaust smoke, and a vertical duct also provided with internal spray nozzles for spraying water upwardly and downwardly. The top portion of the vertical cleaner duct has a baffle purifier. A drain tank is provided below the vertical purifying duct.

U.S. Pat. No. 4,251,236, to Fattinger, teaches a process and processing plant for purifying industrial furnace off-gases containing pollutants in gaseous or solid form. They are treated in an evaporative cooler and then in a dry purifier, and finally in a scrubber by means of a wash liquid. The temperature of the off-gases in the evaporative cooler is kept above the dew point, and the wash liquid in the scrubber is cycled through a slurry separator, from which suspension or solution of pollutants is withdrawn from the sludge separator and fed into the evaporative cooler and mixed in a mixing space in the latter with the hot off-gases.

U.S. Pat. No. 5,017,203, to Cox, discloses a wet scrubber defining a serpentine path in which contact between a polluted gas and scrubbing liquid is effected by projecting the scrubbing liquid onto a rotating propeller to effect atomization of the scrubbing liquid. Purification of the exhaust stream is enhanced by producing turbulence in the air carrying the scrubbing liquid by passing the air carrying the scrubbing liquid between closely adjacent, flexible, vibrating sheets disposed parallel to the gas flow.

U.S. Pat. No. 5,076,818, to Jonsson, describes a system for separating and removing particulates, oxides of nitrogen and sulfur, and other air-polluting substances from exhaust gas streams. The system includes precooling, scrubbing and neutralizing and cleaning subsystems which operate sequentially. Apparatus includes an array of air purification wheels on which water is centrifugally flowed continuously in contact with air passing through the wheel array in travel toward the gas discharge point.

U.S. Pat. No. 5,176,723, to Liu et al, discloses a particle removal system for gas streams, such as combustion flue gases or diesel exhausts. The gas stream is treated to permit very fine particles to coagulate through a short residence time in gas stream conduits, and thereafter is conditioned to saturate the gas stream at a low temperature, such as by water injection. The saturated stream of gas containing the particles is then passed through a particle growth chamber where steam is injected into the gas to supersaturate particles in the gas stream and cause them to grow to approximately one micron in size by water condensing around the particles, whereupon they are removed through conventional particulate removal devices.

U.S. Pat. No. 5,178,653, to Lilja et al, teaches a wet scrubber for treating multiple different gas flows in multiple scrubbing towers. Droplet separation of scrubbed gases takes place in a cyclonic, uniform droplet separator constructed of several cylinders.

U.S. Pat. No. 5,216,898, to Renegar et al, describes an atomizing water nozzle assembly that includes air atomizing spray nozzles in a heated cooling chamber, each spray nozzle connected to a source of cooling water. An inner conduit within the outer conduit interconnects the spray nozzle and a source of compressed air. Water passing through the outer conduit cools both it and the inner conduit. Conical spray patterns produced by the spray nozzles form a circular array within the cooling chamber.

U.S. Pat. Appl. Pub. No. 2016/0243487, by Kim, discloses a cyclonic dust collector which separates dust from exhaust gas discharged from a coffee roasting machine. The dust collector uses a water spray which can prevent nozzle clogging by arranging the nozzles so as to spray water on other spray nozzles in body of the dust collector. Water flows along the side within the inlet which is slant downward and allows the gas to flow into the body of the dust collector. A separate water supply line is connected to the inlet.

From the foregoing patents it is seen that wet cyclonic scrubbers are known. Moreover, wet cyclonic scrubbers for use in reducing PM and VOCs from coffee roasting are known, see, e.g., Kim '487. However, while Kim '487 and other cited art reflects the current state of the art of which the present inventors are aware, none teach an atomizing/nebulizing cyclonic chiller-separator that carefully controls exhaust temperatures to maintain them in an energy efficient window to optimally absorb PMs while also precipitating and separating VOCs from the exhaust gases. Thus, reference to, and discussion of, these patents is intended to aid in discharging Applicants' acknowledged duties of candor in disclosing information that may be relevant to the examination of claims to the present invention. However, it is respectfully submitted that none of the above-indicated patents disclose, teach, suggest, show, or otherwise render obvious, either singly or when considered in combination, the invention described herein.

DISCLOSURE OF INVENTION

The present invention is particularly well-suited for use in reducing and/or eliminating regulated emissions from coffee roasting, but more generally the inventive system can be used to treat exhaust from restaurants, breweries and distilleries, food processing plants, fertilizer processors and manufacturers, poultry processing operations, meet rendering plants, refuse incineration plants, plastics industries, computer manufacturing plants, livestock operations, chemical operations, and numerous other industrial and manufacturing operations which produce particulate and odoriferous byproducts.

The cyclonic chiller-separator of the present invention provides means to condense and precipitate harmful smoke and VOCs from a gaseous waste stream. It does so by dropping and then tightly controlling the temperature reduction of a hot gaseous exhaust stream.

The inventive system uses the energy of a cyclone plus the power of atomized water to condense, precipitate, and remove particulates and condensable organic compounds from exhaust air, muting odors and reducing visible smoke up to 80%. The water is introduced principally in an upper chamber in a treatment tower to get maximum evaporation and chilling as the exhaust air first enters.

It is an object and advantage of the system that it recycles its water and requires minimal daily maintenance.

It is a further object and advantage that the system significantly reduces the risk of roasting fires as the incoming roasting air is cooled to temperatures levels below 150° F., and as a result the exhaust stack and the cyclone remain clean and free of potential flammable accretions.

It is yet another object and advantage of the present invention in that it reduces the risk of injury to operators, as the exhaust stack and cyclone are merely warm to the touch, having been kept cool by the atomized water particles introduced into the inventive system during operation.

A still further object and advantage of the inventive system is that it obviates the need for either an insulated double-walled Class-A chimney pipe or a guard around the cyclone.

Yet another object and advantage of the inventive system is that it works on any coffee roaster and is adaptable for installation after an already-existing cyclone.

A still further, though not final, object and advantage of the present invention is that it may maintain an optimal airflow of the roaster due to the fact that the exhaust stack and the cyclone remain clean and free of accretions that could partially or entirely block the airflow of the roaster, which provides better control over the coffee roasting process and reduces the problems of back pressure created by other methods.

From the foregoing it will be appreciated that the inventive system includes a method to cool a coffee roaster exhaust stream to precipitate VOCs from the exhaust stream as well as to capture PMs.

The inventive system includes temperature controls that assure adequate cooling without interfering with the air flow—thus minimizing pressure drop.

The inventive system may include blowers at each end (input and output) of the system to assure minimal pressure drop throughout the air stream.

In operation, the present invention increases the efficiency of the smoke-to-water contact in a cyclonic chiller-separator, resulting in more efficient capture of pollutants coming out of the vortex outlet. Testing shows that the system reduces smoke, mutes odors, and removes almost all chaff, dust, and oils. It consumes no fossil fuels, generates no greenhouse gases, and generates no additional NOx or VOCs. This is accomplished in a compact design which fits well within the space requirements of typical commercial coffee roasting facilities.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which form the subject matter of claims presented herein.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

BRIEF DESCRIPTION OF THE DRAWINGS

The invention will be better understood and objects other than those set forth above will become apparent when consideration is given to the following detailed description thereof such description makes reference to the annexed drawings wherein.

BEST MODE FOR CARRYING OUT THE INVENTION

Figure 1:
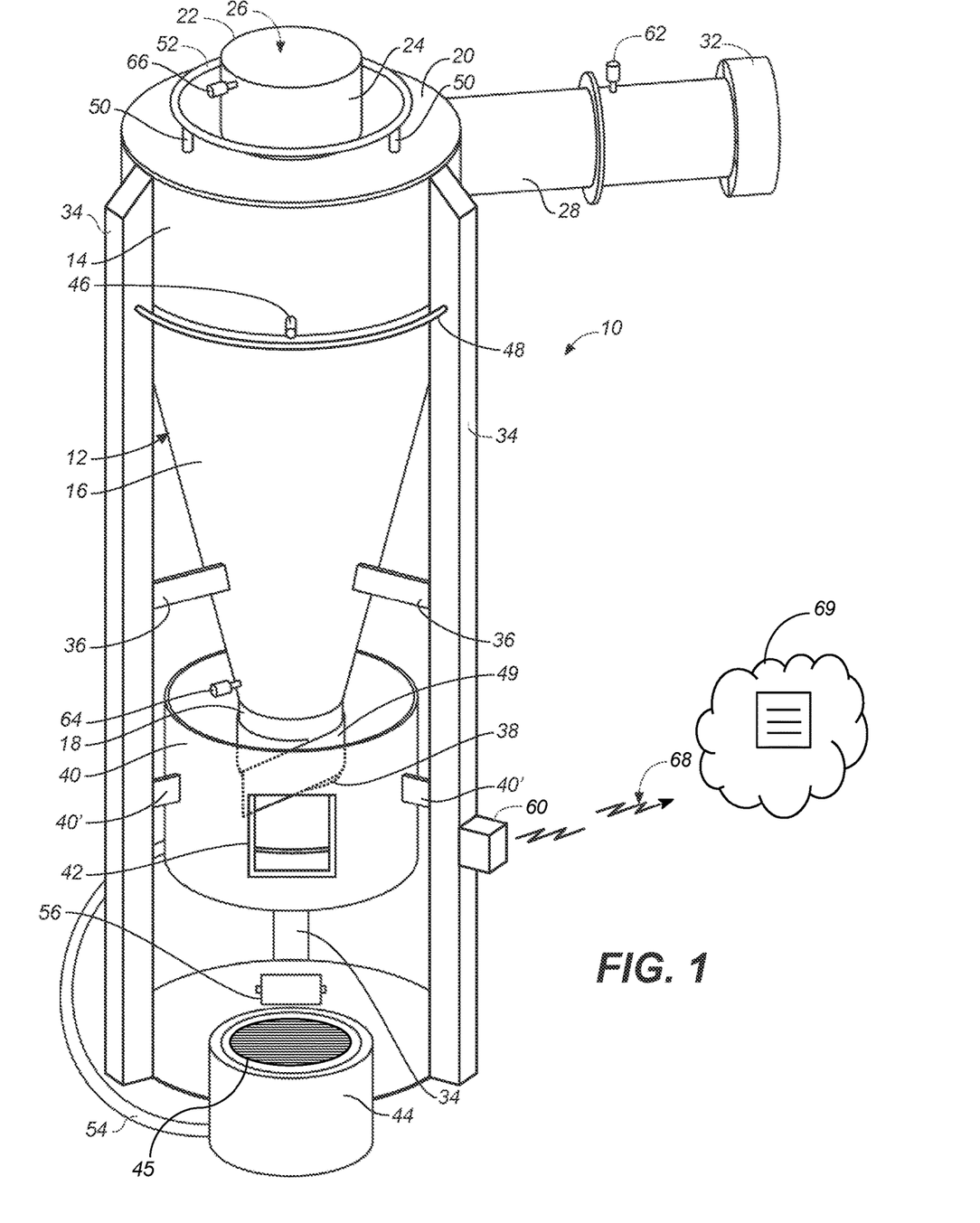
FIG. 1 is an upper perspective view of the temperature controlled cyclonic water chiller-separator of the present invention.
Figure 2:
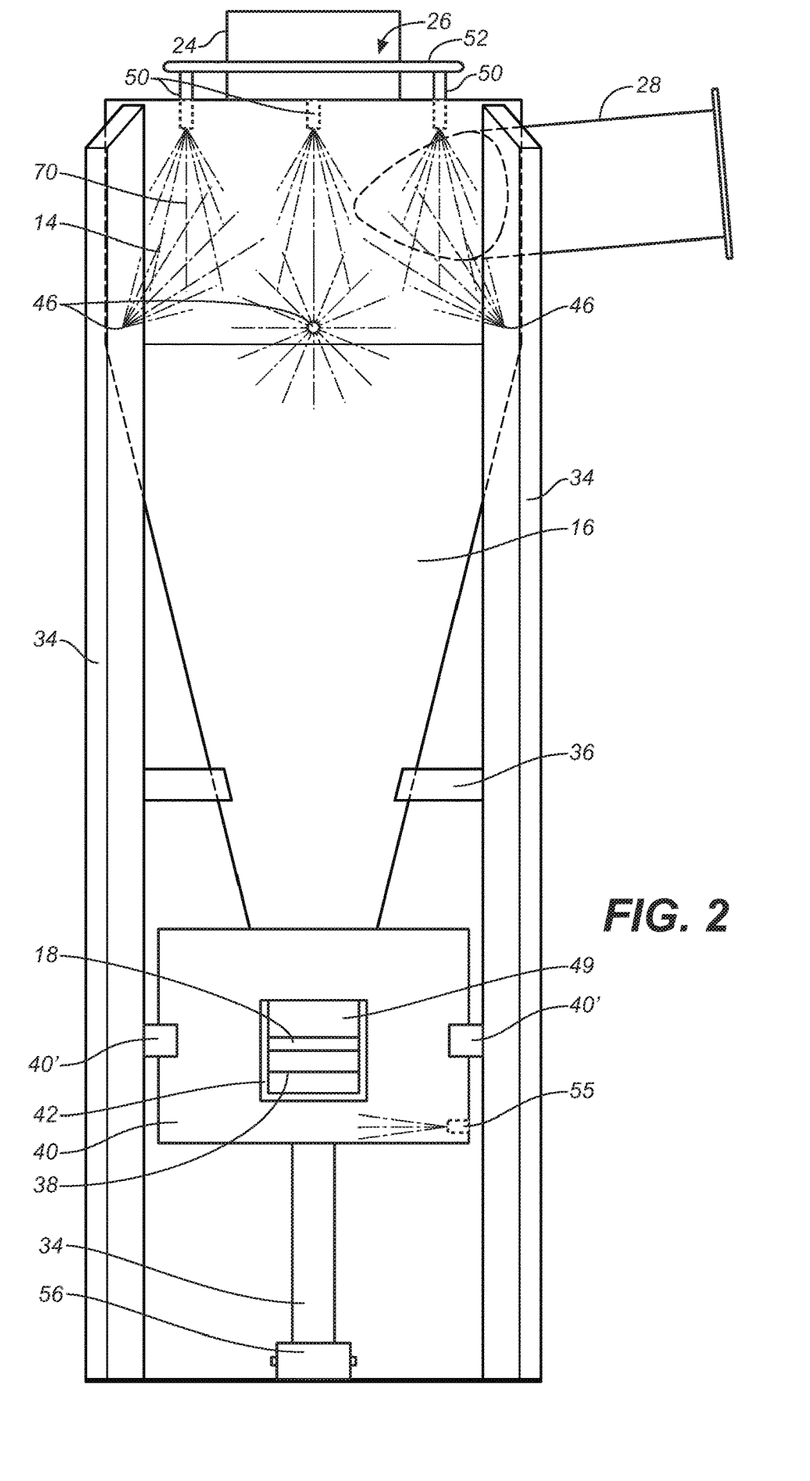
FIG. 2 is a front view in elevation thereof.
Figure 3:
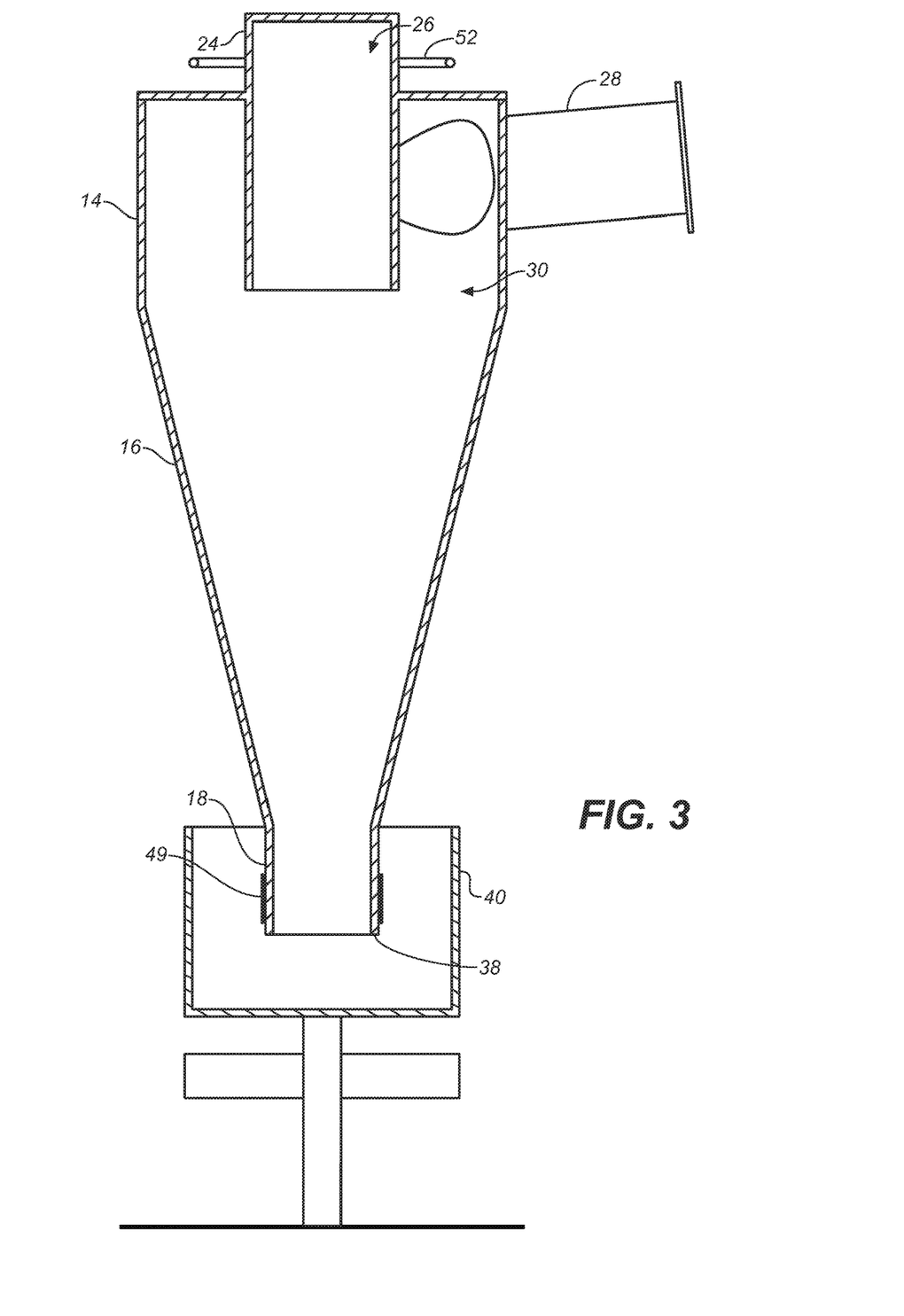
FIG. 3 is a front cross-sectional view in elevation as taken along section line 3-3 of FIG. 4.
Figure 4:
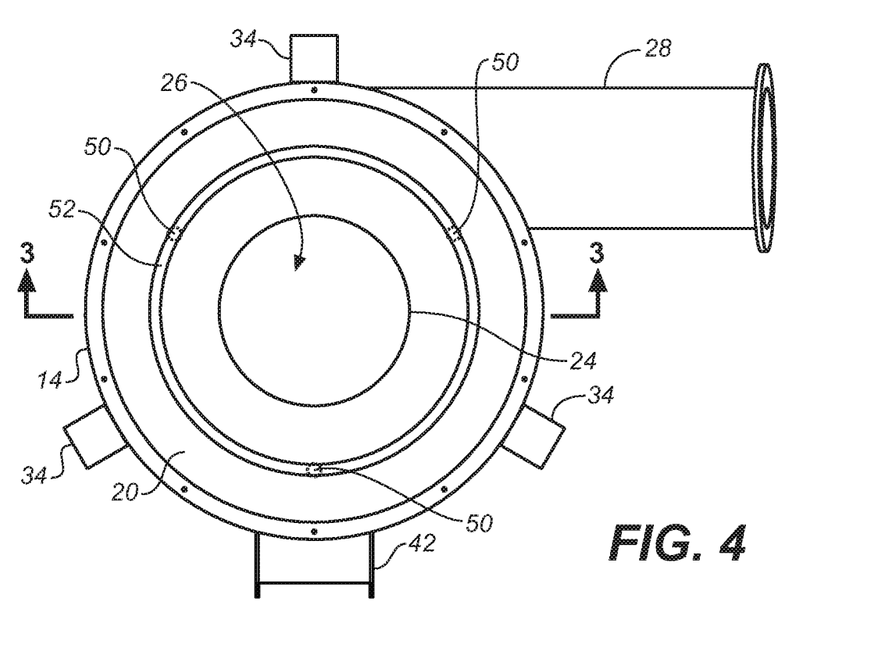
FIG. 4 is a top plan view thereof, with the filter bucket removed.

Referring to FIGS. 1 through 4, wherein like reference numerals refer to like components in the various views, there is illustrated therein a new and improved cleaner for the gaseous exhaust stream from coffee roasting systems, generally denominated 10 herein.

Structural Features: FIGS. 1-4 illustrate an embodiment of the inventive temperature controlled exhaust stream cyclonic water chiller-separator of the present invention 10, which includes a vertically oriented treatment chamber or tower 12 having an upper cylindrical portion 14, a medial conical portion 16 terminating in a lower cylindrical portion 18, a lid 20 atop the upper cylindrical portion, a chimney 22 disposed through the lid and may have a fan or blower 24 (not shown but understood) either operatively coupled at its outlet 26 or internally incorporated, and which supplements the modest natural draft or stack effect for short chimneys to pull the exhaust stream upwardly and out from the treatment tower to vent flue gas directly to atmosphere. The input fan pushes or pulls air out of the roaster and then pushes that air into the cyclone, so there is constant positive pressure moving that air. In embodiments, a fan can be installed somewhere above the cyclone can be provided to constantly draw air through the roaster and into the cyclone chiller-separator.

An exhaust inlet 28 in fluid communication with the interior volume 30 of the treatment tower is in fluid communication with a blower 32 which pulls and/or drives an exhaust stream from a coffee roaster into the treatment tower. The exhaust inlet 28 angles downwardly relative to the treatment tower 12 at approximately 5 degrees to enable water condensation to run back into the treatment tower. The treatment tower itself is secured in an upright position by vertical supports 34 coupled to the tower with braces 36. Either configuration is contemplated: either a single blower/fan 24 on the terminal (exhaust) end of the system or with two blowers/fans 24, 32, the latter on the front (exhaust input) end of the system. The blowers/fans are configured to create very little pressure drop, and thus to minimize or fully eliminate any potentially adverse effect on the roasting process. In the first configuration, the system creates an advantage for roaster air flow, inasmuch as a single blower on the end of the exhaust stack can be used to pull air through the entire roast process. Because the system remains clean from the exhaust inlet 28 through the cyclone and out to the final exhaust outlet 26, the blower can be placed outside the roast room on a roof or wall where it will create little noise and assure negative pressure along the entire air path. But it will be understood that the thermal blower/fan is an optional supplement to the blower/fan invariably found inside a roaster or as the sole source of air movement for the roast exhaust air. Summarily, a roaster may include a single inlet fan, 32, pushing air into the cyclone; or the roaster can have a single outlet fan 24 at the exhaust outlet 26 of the outlet stack to be the sole source of air movement.

Disposed immediately below the open end 38 of the lower cylindrical portion 18 of the treatment tower is a catch basin 40 which collects water and pollutants in solution from the treatment tower and discharges the same through a discharge chute 42 (dam and spillway 42, 42') into a water bin 44, and which is also supported on the vertical supports using catch basin supports 40'.

The water bin (filter basket) 44 includes two filters: a first fine filter to strain very small particles from the discharge water to prevent clogging of nozzles, and a second more course filter to strain out chaff for intermittent disposal by a system operator. These are not shown but are well known in the art.

The water bin (filter basket) 44 includes small porosity mesh screens and membrane filters 45 to capture and collect large particulate chaff, as well as adsorption filters (e.g., activated carbon) to remove VOCs from treatment water. These are not shown but are well known in the art. The lower cylindrical portion acts as a catch basin and includes a dam 49, which is a panel configured to divert flowing water either CW or CCW towards the spillway; it is oriented accordingly and also in cooperation with the direction of flow induced by the cyclone—that is, the direction of fluid flow in the cyclone and catch basin are the same. In alternative embodiments, the fluid flow in the cyclone and the catch basin may be configure to be in the opposite directions, thus when viewed from above, the fluid flow in the cyclone could be CCW while the catch basin fluid flow could be CW, or vice versa.

The treatment tower next includes a plurality of penetrations through which water jets with nozzles are disposed so as to introduce atomized water into the treatment tower interior. Spaced apart water jets and nozzles 46 are first disposed around the upper cylindrical portion 14 of the tower, which are in fluid communication with a water source through fluid line 48. Next a plurality of equally spaced jets and nozzles 50 are disposed through and under the lid 20 fed by fluid line 52 to wet the gaseous exhaust stream first entering the treatment tower from the exhaust gas inlet 28. Water is introduced through fluid lines, first from a recirculation fluid line 54 which feeds treatment water back into the wetting system through a pump 56, preferably located immediately below the catch basin 40, and also through a fluid line 52. Additional jets and nozzles may be disposed in any of a number of locations in the treatment tower, including nozzles 55 in the lower cylindrical portion 18, which may be of a different kind and serve a different purpose; viz., one or more nozzles in the catch basin 40 may be employed to create and sustain a circular flow of water (i.e., a whirlpool) in the catch basin. This whirlpool propels water and chaff in the direction of the discharge chute to aid in moving chaff out of the catch basin and into the filter bucket. While nozzles 46 and 50 are preferably the same types of nozzles, nozzle 55 is a nozzle of a different kind because its purpose is not fine atomization of water, but forceful propulsion of a water jet to induce a whirlpool. Another purpose of the water whirlpool at this point to prevent particulates from settling to the bottom of the catch basin.

Extensive testing shows that water jets and nozzles need not be directed at one another to self-clean. Rather, nozzles apertures tend not to clog because oils are rapidly removed from the exhaust stream. Nozzle aperture and water output is tailored to create high water atomization. This increases the rapidity with which the waste air stream is cooled below the vaporization point of entrained oils.

System control may be manual, with simple on/off operation. Preferably, however, the system includes a PLC or, preferably, a PID controller 60 having a user interface or otherwise in electronic communication with multiple sensors in the system, including: (1) a temperature sensor 62 at the exhaust inlet 28; (2) a temperature sensor 64 at the lower cylindrical portion 18 of the treatment tower; and (3) a temperature sensor 66 in the chimney 24. The PID controller may be dedicated and standalone or in wired or wireless communication 68 with an on-site or offsite network connected server 69 to provide IoT functionality. This need not be described in detail herein as these features have become commonplace in industrial IoT to optimize operational efficiency, automation, and maintenance in processing, manufacturing, and production.

As described more fully below, the control system monitors exhaust air temperature at several points in the system and adjust water output at the nozzles to create an effective cloud 70 of water droplets sufficient to rapidly lower exhaust air temperatures from the high input temperature at the exhaust air inlet to approximately 120° F. It is essential to maintain the effective relationship between the volume of water and the size of the droplets for rapidly cooling the air and entraining particulates without releasing them should smaller water droplets evaporate.

Operational Features: In operation the present invention improves over prior art systems in several ways. The system uses a cyclone vortex with water injection, a principle objective being to bind particulate matter and condense oils so that they are separated from the air by centrifugal force. The performance of the system is then a result of the water droplet size and how they interact with particulate matter contained in the exhaust air. With the particulate matter bound to the vaporized water particles, the cyclone vorticity separates out the water and oil particles with attached exhaust particulate matter, together with the chaff, another roasting process byproduct.

System tuning is focused on ensuring an effective drop in exhaust air temperature. This is accomplished by introducing a sufficiently large volume of water at a rate and within a volume that the water evaporation causes rapid cooling. In an embodiment, this can be accomplished using nozzles with a very fine spray. The smaller water particles are easier to heat due to the surface-to-volume ratio and thus evaporate rapidly. Nozzle spray patterns can be tailored to the tower interior volume to enhance the evaporation and washing effects.

In an embodiment, the inventive system includes first and second blowers at the exhaust input and exhaust output ends. Thus, exhaust from a coffee roaster is "pushed" into the inlet of the treatment system via a blower on or shortly after the roaster output flue and the treated smoke and odor are also "pulled through" the output at the chimney of the system by an exhaust stack termination blower. This enhances airflow exiting the roaster and increases the velocity of the treated air flowing through the system exhaust stack. This operational scheme potentially eliminates the need for an external chaff cyclone on the coffee roaster, as the inventive treatment system becomes the collection area for roasting process byproduct chaff.

In other embodiments, only an exit blower is employed, focusing on pulling air through the system and imposing a fan only into a relatively clear air stream, thereby reducing the maintenance demands created by inserting a fan into the hot and dirty input air stream.

The inventive cyclone chiller-separator works by exploiting the density differential of the particulate matter. Exhaust vapor is cooled to the point that it coalesces out of the exhaust gas stream, and this results in a large density increase. Organic compounds are then at an increased density relative to the exhaust air and are separated in the centrifugal motion induced by the cyclone.

As will be appreciated by those with knowledge in the field, the makeup of the exhaust from a roasting process is extremely complicated, including at least 40 different organic compounds which make up the smoke. Even so, the specific heats of vaporization for the compounds are not critical as they comprise but a small fraction of the exhaust air, and the system cools the full volume of exhaust air. Thus, cooling the exhaust air flow is based on the quantity and quality of the atomized water particles coming from the spray nozzles. The key factor is the surface area of the water particles in contact with the hot exhaust air. The smaller the water droplets, the more surface area per quantity of water, thus reducing the amount of water required. If the droplets are large, more water will be required. Thus, exquisite atomization is advantageous. Measuring droplet size is not, however, critical, as the only balance is quantity of water provided at that droplet size is sufficient to achieve the necessary cooling to 120° F. Thus, monitoring air temperature and controlling water output to achieve the necessary cooling is the fundamental feedback loop: cooling must be sufficient to ensure that organic compounds coalesce into a liquid separable by the cyclone. Other factors (volume of water, droplet size, water temperature) may be controlled as well, but all subordinated to the fundamental air temperature factor. All of these other factors can be varied to achieve the temperature objective.

The inventive exhaust treatment system pulls particulates (chaff, dust, ash) out of exhaust air more efficiently than a conventional cyclone by adding water to quickly wet the particulates, increasing their weight and thereby enhancing the cyclonic effect in flinging them to the side of the cyclone where they wash down into the sump. Additionally, the system pulls oils (including VOCs) out of the exhaust air by changing them from vapor state to liquid state by rapidly cooling the air to below 120° F. early enough inside the cyclone that the centrifugal force has time to pull them to the side. To reduce the smoke leaving the system, the air temperature must be cooled below 120° F. to allow the VOx vapor to coalesce, increase in density, and be separated by the cyclonic action of the vortex. This is controlled using a controller that acquires and responds to temperature data from multiple discreet points in the flow. In embodiments, a PID controller may be used; in others, a simple alarm may provide the necessary alert that an exhaust temperature has exceeded a predetermined threshold, e.g., 120° F. In embodiments, VOC sensors positioned near the system exhaust may be employed to collect data for use by the roaster and local authorities.

At a first point, temperature sensor 62 measures inlet air to the system so that the input exhaust air temperature to the system can be monitored. This first location data point improves estimates regarding temperatures at other stages of the roast process. It is not uncommon for input exhaust temperatures to be in excess of approximately 350° F.

A temperature is also taken at a second point through sensor 64. At this second point, regardless of the input temperature, the exhaust air temperature must be reduced to 120° F. to provide time for liquid and solids to separate out of the system. Note should be made that testing of the inventive system shows that measurements taken at the top of the cyclone are routinely below 100° F. The temperature here must be taken in the free air stream, not on the wall of the system, insofar as recirculated water will cool the walls below the temperature of the air and provide inaccurate measurements of the exhaust air temperature.

A third temperature measurement may be taken at a third point using temperature sensor or probe 66. This third measurement provides an additional data point which validates the measurement at point 2 and provides a summary on overall cooling. The temperature at this point must also be below 120° F.

The temperature data is fed into a control system, either wired to the temperature sensors or in wireless communication. The control system controls the water output from the water circulation and/or recirculation systems. This can be accomplished in two distinct ways. In a first embodiment, an excess capacity pump is throttled via a variable valve (either gate or ball valve) controlled by servo motor. At the air temperature rises, additional water is provided by opening the valve and reducing the pressure drop across the valve. In a second embodiment, the control loop feeds a variable output pump in which pump output is adjusted based on the temperatures measured. As temperatures rise, the pump output is increased in order to maintain the appropriate temperature drop. Both control systems use the incoming air as an indicator of how things in the roast process are changing and also use that information to bias the water control system.

While the foregoing written description and accompanying illustrations provide a full and complete disclosure of the preferred embodiments of this invention, they do not limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative components, structural arrangements, sizes, shapes, forms, functions, operational features or the like. Therefore, the above description and illustrations should not be construed as limiting the scope of the invention.

What is claimed as invention is:

1. A cyclonic chiller-separator, comprising:
   a vertically oriented treatment tower defining an interior volume and having an exhaust inlet disposed in an upper portion, a chimney with an exhaust outlet, an upper cylindrical portion, and a medial conical portion disposed below and integral with said upper cylindrical portion, wherein said exhaust inlet is in fluid communication with said interior volume of said treatment tower through said exhaust inlet and, wherein said exhaust inlet is configured to induce cyclonic fluid motion in an exhaust stream entering said interior volume;
   a coolant water source;
   a plurality of nozzles disposed about interior walls of said treatment tower and in fluid communication with said coolant water source for spraying cooling water into said interior volume above and into an exhaust stream introduced into said interior volume so as to cool, condense, and precipitate volatile organic compounds and organic acids, and to remove particulates from the exhaust stream;
   a lower cylindrical portion disposed below said medial conical portion and having an open lower end;
   a catch basin disposed immediately below said open lower end of said lower cylindrical portion of said treatment tower for collecting water and captured and condensed pollutants in solution and for discharging the same through a discharge chute into a water bin; and
   water jets disposed in said lower cylindrical portion to promote and sustain the cyclonic motion of the exhaust stream and configured to induce a circular flow of water in said catch basin.

2. The cyclonic chiller-separator of claim 1, wherein said plurality of nozzles includes water atomizers.

3. The cyclonic chiller-separator of claim 1, wherein said discharge chute includes a dam and a spillway.

4. The cyclonic chiller-separator of claim 1, further including filters in said water bin and a water recirculation system for cycling discharge water back into said treatment tower.

5. The cyclonic chiller-separator of claim 1, wherein said treatment tower further includes a lid atop said upper cylindrical portion and a chimney disposed through said lid.

6. The cyclonic chiller-separator of claim 5, further including an exhaust inlet is in fluid communication with said interior volume of said upper cylindrical portion.

7. The cyclonic chiller-separator of claim 6, further including a blower for pulling an exhaust stream from a heating system through said exhaust inlet and pushing the exhaust stream into said treatment tower.

8. The cyclonic chiller-separator of claim 1, further including a blower for pulling an exhaust stream from a heating system through said exhaust inlet and pushing the exhaust stream into said treatment tower.

9. The cyclonic chiller-separator of claim 8, wherein said exhaust inlet angles downwardly relative to said treatment tower.

10. The cyclonic chiller-separator of claim 9, wherein said downward angle of said exhaust inlet is an approximate 5 degree angle so as to enable water condensation to run back from said exhaust inlet in said treatment tower.

11. The cyclonic chiller-separator of claim 1, wherein the movement of exhaust air is promoted by at least one blower.

12. The cyclonic chiller-separator of claim 11, wherein said at least one blower is a single blower disposed on said exhaust stream inlet.

13. The cyclonic chiller-separator of claim 12, wherein said at least one blower includes a single blower disposed on an exhaust end of said treatment tower.

14. The cyclonic chiller-separator of claim 13, wherein said at least one blower includes two blowers, including a first blower on an exhaust stack of said treatment tower and a second blower an exhaust input end of said treatment tower, wherein said first blower produces a negative pressure along the entire air path of the exhaust stream from said input to said exhaust input end to said exhaust stack.

15. The cyclonic chiller-separator of claim 14, wherein said first and second blowers are configured to create minimal pressure drop so as not to adversely affect the heating process preceding said treatment tower.

16. The cyclonic chiller-separator of claim 15, wherein said single blower on said exhaust stack is in fluid communication with air from an industrial heating system which releases exhaust air into said treatment tower and thereby pulls air through said treatment tower and the heating system.

17. The cyclonic chiller-separator of claim 1, further including a catch basin disposed immediately below said open lower end of said lower cylindrical portion of said treatment tower for collecting water and captured and condensed pollutants in solution and for discharging the same through a discharge chute into a water bin.

18. The cyclonic chiller-separator of claim 17, further including a system controller and multiple sensors disposed in said treatment tower in electronic communication with said controller, said sensors including a temperature sensor at said exhaust inlet, a temperature sensor in said lower cylindrical portion of said treatment tower, and a temperature sensor in said chimney.

19. The cyclonic chiller-separator of claim 18, wherein said controller is a programmable-integral-derivative controller in electronic communication with an on-site or offsite network connected server to provide Internet-of-Things ("IoT") functionality.

20. The cyclonic chiller-separator of claim 18, wherein said system controller monitors exhaust air temperature at several points in said chiller-separator and adjusts water output at the nozzles to create an effective cloud of water droplets sufficient to rapidly lower exhaust air temperatures from high input temperatures at said exhaust air inlet.

* * * * *